United States Patent Office 3,069,442
Patented Dec. 18, 1962

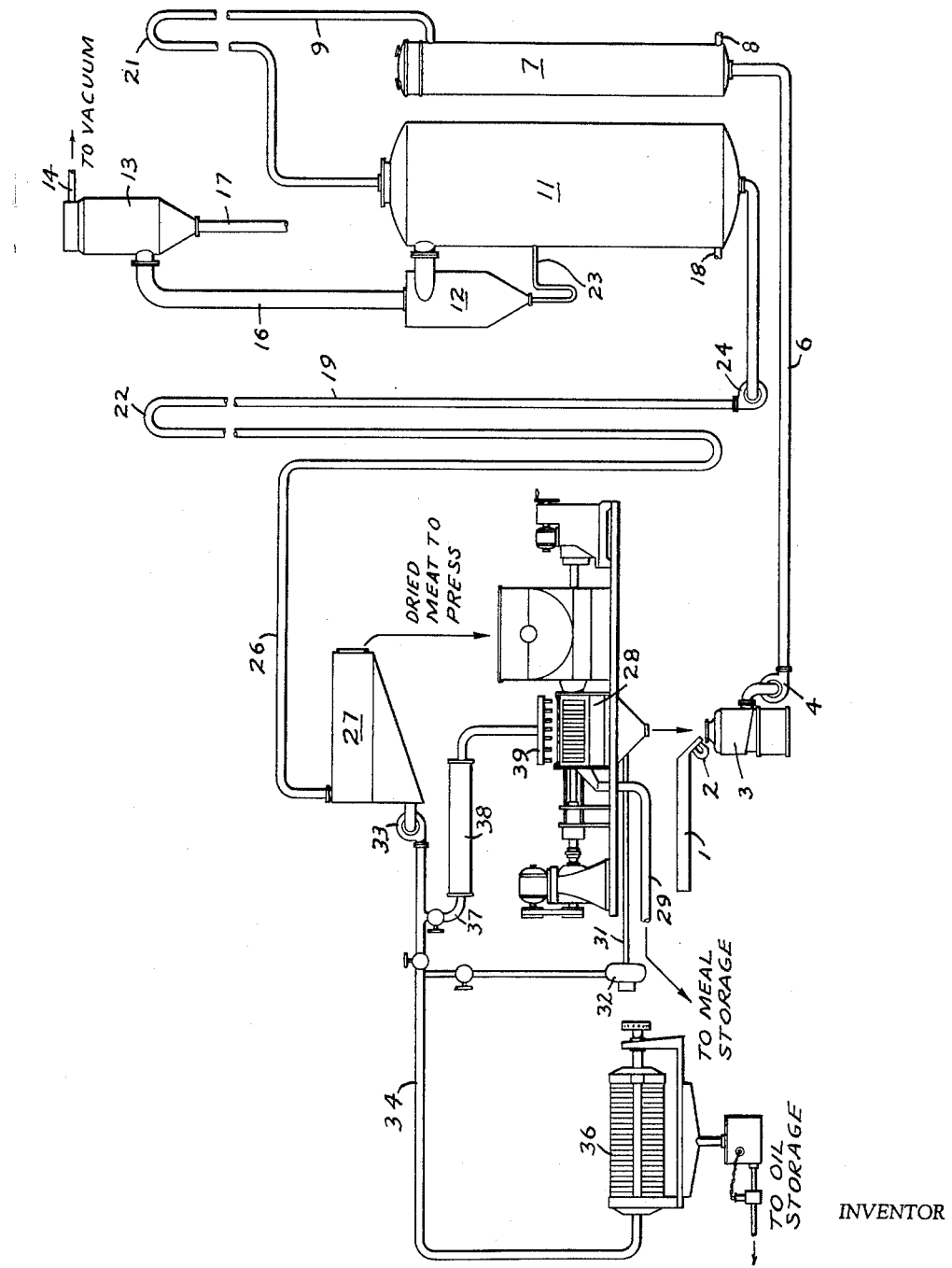

3,069,442
PROCESS FOR TREATING FRESH COCONUTS
Stanley Hiller, Berkeley, Calif., assignor to Coproducts Corporation, San Francisco, Calif., a corporation of California
Filed Aug. 10, 1959, Ser. No. 832,739
2 Claims. (Cl. 260—412.2)

This invention relates generally to the treatment of fluid bearing material. More particularly the invention relates to a process and system for removing moisture from fresh, wet, oil bearing material to dry the same and for expressing and recovering oil or the like from such material.

Because of the unusual problems presented in treating an easily contaminated food product such as fresh, wet coconut meat or the like which deteriorates very rapidly when the protective shell or husk is opened and the meat is exposed to air, this invention is described primarily with respect to the processing of coconut meat. However, it should be understood that the invention is equally well adapted for the treatment of other moisture and oil bearing materials such as soybeans, cottonseeds, fish, animal meat products and like materials which are made up of a large percentage of moisture and oil or oil-like material such as tallow, fats and the like. The process and system employed in this invention and described hereinafter for drying and expressing oil from fresh coconut meat is basically the same when used in treatment of other similar materials with only mechanical adjustments and modifications being required to adapt the system and process for the treatment of materials of various characters.

Coconuts are one of the world's great natural resources which are available in abundant quantities in humid areas of the world that are otherwise relatively short of protein and other important food products. Because coconut meat and oil is high in food value, particularly fats and proteins, its importance as a source of food in such areas may be compared generally to the importance of dairy herds in the more temperate climates. If coconuts are properly treated to conserve the natural nutritional values in oil and protein meal which they contain, they can be a valuable and plentiful source of food.

In a typical coconut producing area such as the Philippine Islands, where the production of coconuts constitutes roughly 40% of the agricultural economy, the coconuts have not been treated heretofore in a manner which takes full advantage of the potential value of the coconuts to the producer or to the food economy of the country. This is so because, to a very large extent, coconuts are treated today in much the same manner as they have been treated for many years. That is, the coconuts are air, smoke or sun dried by hand operations to produce copra, which is dried coconut meat.

In those areas where labor costs are high so that the hand treatment of the coconuts is no longer economical, quite frequently the coconuts are left on the trees or otherwise neglected and little or no use is made of the inherent food value which the coconuts possess. This situation exists because no suitable and economical system has been devised heretofore for rapidly and effectively converting fresh, wet coconut meat to edible protein meal and oil.

Because coconuts possess a very hard outer shell or husk which encloses the hollow body of coconut meat in which the liquid generally referred to as coconut milk is enclosed, the meat cannot be dried without first breaking open the shell. This is in distinction to other nuts and oil bearing seeds which can be air or sun dried without breaking the husk or shell, and which may be transported or stored in the shell for long periods without damage or deterioration to the meat thereof. Coconuts, however, cannot be dried in the shell nor can they be transported or stored economically for subsequent treatment. As a result, processing of fresh coconuts in an area other than that in which the same are grown is not economical or feasible.

In the well known method of producing copra, in which the coconut shells are cracked and the meat air, smoke or sun dried, immediate decomposition commences in the coconut meat upon breaking of the shell. This is due to the fact that the coconut milk with which the coconut meat was originally in contact is of a nature similar to mother's milk which cannot be exposed to the atmosphere for more than a very brief period of time without becoming rancid, sour and contaminated. Furthermore, the treatment of coconuts by first air, sun or like drying the same to make copra is unsatisfactory because the resulting dried meat is not suitable for human consumption because the same has become rancid and contaminated during the drying operation. Similarly, the oil which is entrapped in the cells of the copra, while the same may be extracted after drying, is rancid and has a very poor flavor and aroma. It is therefore necessary to refine the oil by employing a well known caustic soda or other complicated treatment to remove rancidity and to then deodorize and bleach the oil by passing steam or the like therethrough to remove the undesirable taste and aroma to make the oil palatable. That is, oil removed from copra may be made fit for human consumption by an expensive refining, clarifying and deodorizing procedure but the solids from copra cannot be made suitable for human consumption and generally are used only for animal feed.

Because of these undesirable features attendant to treating coconut oil and solids produced with the copra process, certain prior art attempts have been made to mechanically handle and treat coconuts during the extraction of oil therefrom. However, such prior art arrangements also have proven unsuitable because rancidity has proven a major problem. Generally mechanically conveyors of the belt or screw type have been employed heretofore which possess areas or locations on which particles of wet coconut meat may collect. Because of the tendency of wet coconut meat to turn rancid rapidly, the prior art arrangements have proven unsuitable because of the extreme difficulty in maintaining the treatment systems free of areas or locations where fresh coconut particles can collect. Once such particles have begun to turn rancid, the entire system is adversely affected thereby and results obtained in the finished product are far from satisfactory.

Accordingly, the present invention relates to a system and process for treating fresh, wet coconut meat and like materials to rapidly dry the same shortly after the same has been separated from the coconut shells and before adverse affects due to atmosphere have resulted. Similarly, the invention relates to a system and process in which fresh coconut meat and like materials may be treated which do not employ mechanical belt, screw or like type conveyors which possess areas on which wet meat particles may accumulate and become lodged. Furthermore, the invention relates to a system and process for treating fresh coconut meat and like materials which involves flash extraction of moisture from the same which is accompanied by deodorization and deoxidation of the meat and oil so that an edible meal and oil may be recovered from the fresh meat.

Objects of the present invention include the provision of a process and system for treating fresh coconut meat and like oil bearing materials by flash drying the same under reduced pressure in a bath of oil of the same character as that contained in the meat so that the meat is dried and deodorized simultaneously as is the oil bath in which the meat is carried; the provision of a system which is free of belts, screws or like mechanical conveyors so that no areas are provided on which particles of material can lodge so that rancidity in the system is precluded; and the provision of a system and apparatus for separating oil from flash dried material whereby an edible protein meal and edible oil product are produced which need a minimal, if any, subsequent treatment before the same are ready for human consumption. These and other objects will become apparent from studying the following specification, in which reference is directed to the accompanying drawing.

FIG. 1 is a more or less schematic flow-type diagram illustrating one desirable embodiment of the material treating and handling system of this invention.

As noted previously, the present invention is applicable to various wet oil, tallow or fat bearing materials and is particularly well suited for the treatment of fresh coconut meat. Accordingly, for purposes of illustration, reference will be directed herein to treatment of coconut meat. However, it should be understood that the invention also is equally well adapted for treating other materials.

Fresh coconut meat in the condition in which the same is removed from a freshly opened coconut shell comprises approximately 50% water, 30% coconut oil and 20% protein meal. If coconut meat is air or sun dried, as is generally done to produce copra, the water content of the meat may be materially reduced, perhaps to approximately 5% water, but uniform results cannot be assured. This procedure, however, takes a minimum of several weeks, during which time the meat itself has become rancid, contaminated and unfit for human consumption.

Similarly, if the meat is attempted to be dried more rapidly by using smoke or heating kiln, the procedure still takes from 20 to 30 hours. In such faster operations, however, the moisture content is reduced to only about 15%, which is not sufficient to make the same commercially acceptable. In addition, because of the rapid deterioration of coconut meat, the same also can become rancid in the 20 to 30 hours required for preliminary drying. This system, therefore, is not acceptable because a subsequent drying step is still required and the resulting dried meat is not edible, just as in the case of air or sun dried copra.

Accordingly, this invention relates to a process and system for treating fresh coconut meat immediately after the same is separated from the shell to provide an edible dried protein meal having the requisite amount of dryness (below 10% moisture) and low oil content (in the range of 5–10%), and an edible coconut oil which has been expressed from the dried meat. Because, as will be described, the coconut meat is rapidly dried and treated in its fresh condition, it is not necessary to deoxidize or clarify the oil or meal produced as is true with prior methods. Similarly, waste is to a minimum. The resulting oil can be used for cooking purposes and finely ground meal can be used for baking or the like after discharge from the system.

Summarizing the process and system of this invention, fresh coconuts are opened manually or by any suitable mechanical means and the milk therefrom taken off to be used as the producer may desire. Following separation of the meat from the shell, the wet, fresh meat is finely divided or ground in a quantity of oil of the same character as that contained in the meat. In the case of coconuts, the meat is ground in a quantity of coconut oil. This grinding in oil precludes rancidity in the grinder in that the meat particles are continuously agitated by the oil and cannot become lodged in the grinder.

After grinding, the liqui-form product comprised of the ground fresh meat and oil are moved to a preheater in which the temperature of the meat and oil is raised to a moderate level at atmospheric pressure to a temperature which is below 212° F. Thereafter, the heated oil and wet meat are subjected to additional heat at reduced pressure which results in the moisture in the meat being boiled off at a much lower temperature than would be possible at atmospheric pressure. In this manner, moisture in the meat is driven off and the meat is dried to an acceptable level of well below 10% by weight without meat burning or discoloration.

Boiling of the moisture in the meat results in the discrete meat particles more or less exploding as the moisture therein is rapidly transformed to steam. Such exploding produces rupture of the individual cells of the meat particles so that subsequent removal of oil from the cells may be more easily effected subsequently. In addition, cell rupture liberates moisture from the particles more rapidly so that a more effective and complete flash extraction of moisture may be effected. The steam escaping from the material during the drying operation is effective to deodorize the meat and oil. The escaping steam is collected in any suitable manner and withdrawn from the system.

During the drying operation cell rupture also liberates a certain mount of oil from the meat which joins the quantity of free oil in the system in which the meat being treated is carried. Following drying of the meat, the same still contains a substantial quantity of oil which is removable and usable as a food product. The dried meat carried with the free oil through the system is separated from the free oil by any suitable screening device. Thereafter the dried oil-containing meat is transferred to an oil expressing device, desirably of the screw press type, in which pressure is applied to the dried meat to effect removal of oil therefrom. The protein meal produced from pressing of the dried meat is suitable for human consumption without subsequent treatment.

A given quantity of the free oil extracted in the press device may be returned to the system for use in grinding additional fresh meat presented thereto. Because substantial pressures are applied to the meat in the press device, minute particles of meal may be forced from the device with the oil. Accordingly, the oil intended for subsequent consumption desirably is returned to the system and is subjected to a subsequent filtering operation which removes such minute particles. The fine particles thus removed also may be returned to the system for additional treatment if necessary or may be added to the dried meal previously discharged from the press device.

In this manner a process of treating fresh coconut meat which converts the coconut meat directly into an edible protein meal and edible oil without requiring subsequent clarifying, bleaching or deodorizing operations may be effected, and a higher quality meal and oil than heretofore known is produced directly without requiring subsequent treatment.

While the process desirably is carried out continuously for economy of operation, the same is equally well suited to batch processes in which given quantities of fresh coconut meat or similar materials are processed in discontinuous operations.

While the process of this invention may be carried out by employing various types of apparatus, FIG. 1 illustrates a material treating system which comprises a combination of treatment devices arranged so that the material to be treated may flow therethrough automatically and manual or mechanical handling thereof, other than at the entrance and discharge points thereof, is unnecessary.

The system illustrated comprises an inspection and feed table 1 onto which sections of fresh, wet coconut meat or like material are positioned mechanically or by hand. Magnet means 2 is provided at one end of the table, the intended purpose of which is to remove any metal particles which may have been inadvertently introduced into the coconut supply.

The sections of fresh coconut meat are mechanically or manually fed into a grinder 3 of any suitable construction in which the same are finely divided into discrete particles desirably of the size of ground coffee or the like. In grinder 3, a quantity of coconut oil is simultaneously inserted with the fresh meat so that the fresh coconut meat sections are ground in oil. This arrangement precludes catching or lodging of wet, easily contaminated coconut particles within the grinder in that the grinder is continuously flushed out and cleaned by the oil so that build up of particles therein which might produce rancidity is precluded.

Closed conduit means, in the form of suitable sections of metal pipe which extend throughout the system and connect the various devices thereof, is provided. It is through such conduit means that the liqui-form product comprised of the free oil inserted into the grinder 3 and the finely divided particles of fresh meat carried therein is transported through the system. To effect movement of the free oil and meat particles through the system, a pump device, desirably of the centrifugal type, is provided at 4 for pumping the free oil and meat through the system. Pump 4 may be driven in any suitable manner, such as by an electric motor or a belt connected to a diesel engine or the like.

Because a pump and pipe conduit system desirably is employed, conventional conveyor means used in mechanical processes heretofore, such as belt and screw-type conveyors, are entirely eliminated. As a result, the system has no areas or surfaces in which particles of wet meat can accumulate which would cause rancidity in the system.

Pump 4 moves the meat and free oil through a pipe section 6 into a preheater 7 which is of any conventional type and desirably which includes a series of internal steam pipes within the jacket thereof around which the free oil and wet meat are circulated. A steam trap 8 is provided at the bottom of preheater 7 through which condensed steam or the like may be withdrawn from the preheater steam pipes during operation if the same is necessary. The steam within the pipes of the preheater may be supplied thereto in any well known manner.

Temperature of the preheater is controlled so that the oil and meat to be dried is heated to a level well below the boiling tempertaure of water at atmospheric pressure; namely, 212° F. In this manner, discoloration or burning of the meat in the preheater is precluded.

Following heating in the preheater, the heated free oil and meat are transferred through inverted U-shaped pipe section 9 which extends vertically upward a substantial distance and then extends downwardly into a flash extractor 11. The flash extractor is a heat exchanger similar to the preheater and also comprises a series of heating steam pipes 7 arranged therein in a well known manner about which the heated free oil and wet meat is circulated. A catch-all chamber 12 is interposed between flash extractor 11 and a condenser 13 positioned adjacent thereto. Condenser 13 is operatively connected by pipe connection 14 to a suitable vacuum source which lowers the pressure within flash extractor 11 to a level below atmospheric pressure so that the flash extractor is maintained under vacuum and serves as a vacuum chamber. The vacuum pressure in the flash extractor 11 may be varied to any level found suitable for flash drying the particular type of material being treated.

Because the flash extractor interior is maintained under a vacuum, the boiling point of water therein is less than the boiling point of water at atmospheric pressure. Accordingly, as the particles of wet material are introduced into the flash extractor 11, the particles more or less exploded as the water therein is rapidly converted to steam. This explosion results in rupturing of the individual cells of the particles which facilitates effective water removal and subsequent oil removal therefrom. In addition, cell rupture also releases a certain percentage of oil from the particles at the same time the water in the particles is released.

Because of the temperature of the vacuum chamber and flash extractor 11 is maintained well below the boiling point of water at atmospheric pressure, the coconut meat can be dried to a level well below 5% without discoloring, burning or otherwise adversely affecting the resultant protein meal and oil which is in the system. In addition, the steam generated when the water is extracted from the meat particles serves to deoxidize and deodorize the meat and oil in the flash extractor so that the need to subsequently deodorize or deoxidize the meat and oil after discharge from the system is eliminated or is maintained at an absolute minimum.

Steam released from the meat and air introduced into the system at grinder 3 rises through pipe 16 extending upwardly from catch-all 12 and passes into condenser 13 from which it is carried off by pipe 17 to a waste receptacle. Flash extractor 11 also is provided with a steam trap 18 at its bottom through which condensate from the heating pipes therein may be removed.

Although the meat particles after drying in flash extractor 11 contain only a small percentage of moisture, they still contain substantial quantities of oil. Accordingly, the free oil and dried meat is carried from the flash extractor through another inverted U-shaped section of vertically arranged piping 19 to suitable apparatus for extracting such oil.

Because flash extractor 11 is subjected to a vacuum atmosphere, pipe sections 9 and 19 desirably are of sufficient length so that the free oil therein forms a head which provides vacuum seals at points 21 and 22 at the upper U-shaped portions of the pipe sections. In this manner, the flash extractor inexpensively may be maintained under a vacuum while the remainder of the system is maintained at atmospheric pressure.

Catch-all chamber 12 is of any well known construction and is provided adjacent flash extractor 11 so that any foam or fine particles of dried meat which may pass from the flash extractor with the steam produced therein may be trapped and returned through a connecting pipe 23 to the system.

Because of the substantial head which imparts the vacuum seals 21 and 22 to the pipe section 19, it has been found desirable to employ a second centrifugal pump 24 adjacent the bottom of the flash extractor for pumping the free oil and dried meat particles through the remainder of the system.

Because the material has been dried to a level well below 5% in the flash extractor, the problem of contamination thereof has been reduced to a minimum so that the dried particles thereafter can be subjected to the atmosphere without danger of the same turning rancid. Prior to drying, however, the wet meat was treated in a closed system separated from the atmosphere and was continuously moved so that rancidity was precluded.

Following drying, the free oil and dried meat are moved through pipe section 26 onto a separating screen 27, desirably of the well known shaker type, which separates free oil from the dried meat particles. That is, the meat particles are retained on the screen and the free oil passes therethrough in a well known manner. The dried meat particles thus separated are transferred in any suitable manner into a device for expressing therefrom the oil contained therein. Such device desirably comprises a press 28 of the screw type which applies substantial pressure to the dried meat particles and expresses the oil therefrom until the oil content of the particles is lowered to below 10%. These substantially oil free and dried particles then comprise the edible protein meal which is fit for human consumption without subsequent treatment. The protein meal is discharged from the press through a conduit or chute 29 and is then transferred to meal storage.

The press employed with this system may be of any suitable type such as that shown in Patents 2,004,408 or 2,149,736. Alternatively, the press employed may take the construction of that shown in my application entitled "Press and Cage Assembly," Serial No. 835,698, filed August 24, 1959.

A certain quantity of oil expressed from the dried meat particles in press 28 is transferred through a conduit section 31 by means of another centrifugal pump 32 back into the system for final treatment. However, a given quantity of oil expressed in press 28 is discharged directly into grinder 3 mentioned previously. In this manner, the press is a continuous source of fresh free oil in which additional fresh coconut meat can be ground if the process is to be of a continuous nature.

The oil separated from the dried meat on screen 27 passes through a booster pump 33 which moves the same and the oil returned to the system from press 28 through pipe section 34 toward a filter press 36. Desirably, however, a certain quantity of oil is drawn off from the system through pipe 37 and is passed through an oil cooler 38 of any conventional construction and is then sprayed by means of head 39 over the exterior of the press 28 to effect cooling of the same. The oil thus used for cooling is accumulated beneath the press with oil expressed in the press and is handled in the manner described previously.

Because minute particles of meal may pass with the free oil through the filter screen 27 and also may be expressed from press 28 with oil separated from the dried meat therein, filter press 36 is provided to separate, by using moderate pressures, any such minute particles from the edible free oil to be discharged from the system. Filter press 36 is of any conventional type well known for this purpose. Minute particles separated thereby, if sufficiently oil free, may be transferred directly to meal storage or may be returned to the system for additional treatment if the same is deemed necessary. The edible oil separated in filter press 36 is taken off and transferred to oil storage in a condition which requires little, if any, subsequent treatment to make the same suitable for human consumption. This is in distinction to the previously described method of producing copra in which substantial deoxidation and deodorization operations were required for the oil separated from the inedible copra.

While the system of this invention may be operated at various capacities, depending to a large extent upon the particular product being treated, one typical example embodying the treatment of fresh coconut meat in a continuous process will be described as being illustrative and typical. It should be understood, however, that the same is not intended to be in any way limiting on the invention in that modification of the arrangement can be varied to meet a particular need.

Grinder 3 desirably is of a type having a large capacity and into such grinder are fed half or quarter fresh coconut meat sections at the rate of 4000 lbs. per hour. The meat is finely divided or ground into discrete particles having about the size of ground coffee; that is, particles of a size which will pass through a ⅛ inch screen are acceptable. To this quantity of meat in the grinder is added approximately three times as much free coconut oil at the rate of 12,000 lbs. of oil per hour. A higher oil to meat ratio, up to 7 to 1, also has been found acceptable. Because coconut oil weighs approximately 7 lbs. per gallon, the hourly input of oil to the grinder in the continuous operation is slightly in excess of 1700 gallons.

Prior to insertion of grinding oil and fresh meat to be ground into grinder 3, however, the entire system defined by pipes, preheater, flash extractor, etc., has previously been filled with free oil. Approximately 100 gallons (700 lbs.) is required for this purpose.

The centrifugal pumps 4, 24 and 33 employed in the system desirably are of a size capable of handling 100 gallons per minute of the free oil and meat particle mixture. The product to be treated is moved continuously via 2 inch pipe sections through the system with substantial pressure so that individual particles cannot become lodged in the system.

To preclude meat burning and discoloring, the temperature of preheater 7 and flash extractor 11 are maintained well below the boiling point of water at atmospheric pressure. 180° F. has been found to be a suitable temperature for treating coconut meat and both the preheater and flash extractor are heated to about that temperature.

At this moderate temperature, a vacuum of approximately 22 inches of mercury has been found effective to produce flash drying of the coconut meat particles to an acceptable moisture content of only 2.5%.

Reducing the moisture content of the meat in this manner to 25% by weight, approximately 1900 lbs. of water per hour are withdrawn by the condenser from the system from meat dried in the flash extractor which originally contained an average of 50% water.

In the press, the oil content of the dried meat is reduced to approximately 5%. On this basis, over 800 lbs. of low oil content protein meal is discharged from the press per hour. Also about 1100 lbs. or 160 gallons of new, free oil per hour is expressed from the dried meat which, as noted previously, is partly withdrawn from the system and partly returned to the system for use in grinding additional meat added to the system in the continuous operation.

While a full disclosure of the invention has been made with respect to one particular moisture and oil bearing material, modification of the system and process which may be made by persons skilled in the art, and their application to materials other than fresh coconut meat, are intended to be included in the invention and the same should be interpreted in light of the appended claims.

I claim:

1. A process of treating fresh, wet oil and moisture bearing coconut meat for drying said meat without discoloration thereof and for separating oil therefrom for obtaining a quantity of high quality low oil content dried edible protein meal and a quantity of high quality edible coconut oil from said meat: said process comprising the steps of separating a quantity of fresh, wet, untreated coconut meat from coconut shells; introducing said separated meat promptly after separation into a bath of free liquid coconut oil and immersing said meat in said oil bath; finely dividing said meat into discrete particles while said meat is still fresh and immersed in said oil bath; heating said oil bath with said meat particles immersed therein to a temperature below the boiling point of water of about 180° F.; subjecting said immersed meat particles and said oil bath while heated to said temperature to a vacuum; driving off moisture from said immersed and heated particles as steam by continuing subjection of said particles and said oil bath to said vacuum until the moisture content of said particles is reduced to a level below 10% so that said particles are thereby rapidly dried without attendant discoloration; separating said thus dried meat particles from said oil bath; and expressing retained oil from said dried meat particles by subjecting said particles to pressure until the oil content of said dried particles is reduced to a level below 10%.

2. The process of claim 1 in which said vacuum to which said heated meat particles are subjected is maintained at approximately 22 inches of mercury.

References Cited in the file of this patent

UNITED STATES PATENTS

| | | |
|---|---|---|
| 1,789,751 | Hiller | Jan. 20, 1931 |
| 1,966,181 | Lowry | July 10, 1934 |
| 2,101,371 | Lara | Dec. 7, 1937 |
| 2,467,529 | Hormel | Apr. 17, 1949 |
| 2,651,647 | Greenfield | Sept. 8, 1953 |
| 2,773,889 | Kao | Dec. 11, 1956 |
| 2,911,421 | Greenfield | Nov. 3, 1959 |

UNITED STATES PATENT OFFICE
CERTIFICATE OF CORRECTION

Patent No. 3,069,442                                        December 18, 1962

Stanley Hiller

It is hereby certified that error appears in the above numbered patent requiring correction and that the said Letters Patent should read as corrected below.

Column 2, line 38, for "mechanically" read -- mechanical --; column 3, line 54, after "is" insert -- kept --; column 4, line 20, for "mount" read -- amount --; column 5, line 48, after "preheater" insert -- 7 --; line 49, strike out "7"; column 5, lines 65 and 66, for "exploded" read -- explode --; line 73, strike out "of", first occurrence; column 8, line 12, for "25%" read -- 2.5% --.

Signed and sealed this 27th day of August 1963.

(SEAL)
Attest:

ERNEST W. SWIDER
Attesting Officer

DAVID L. LADD
Commissioner of Patents